US011799135B2

(12) United States Patent
Ferrarese

(10) Patent No.: US 11,799,135 B2
(45) Date of Patent: Oct. 24, 2023

(54) ENVELOPING MACHINE FOR ENVELOPING PLATES FOR ELECTRIC STORAGE BATTERIES AND METHOD FOR MANIPULATING PLATES FOR ELECTRIC STORAGE BATTERIES IN SAID ENVELOPING MACHINE

(71) Applicant: SOVEMA GROUP S.P.A., Villafranca di Verona (IT)

(72) Inventor: Luciano Ferrarese, Lavagno (IT)

(73) Assignee: SOVEMA GROUP S.P.A., Villafranca di Verona (IT)

( * ) Notice: Subject to any disclaimer, the term of this patent is extended or adjusted under 35 U.S.C. 154(b) by 348 days.

(21) Appl. No.: 17/147,492

(22) Filed: Jan. 13, 2021

(65) Prior Publication Data
US 2021/0218069 A1   Jul. 15, 2021

(30) Foreign Application Priority Data

Jan. 13, 2020 (IT) .......................... 102020000000415

(51) Int. Cl.
*H01M 10/14* (2006.01)
(52) U.S. Cl.
CPC .................................. *H01M 10/14* (2013.01)
(58) Field of Classification Search
CPC .................................................... H01M 10/14
See application file for complete search history.

(56) References Cited

U.S. PATENT DOCUMENTS 4,314,403 A    2/1982  Sanekata

FOREIGN PATENT DOCUMENTS

| CN | 102709516 A | 10/2021 |
|---|---|---|
| WO | 99/16692 A1 | 4/1999 |

OTHER PUBLICATIONS

European Search Report of EP 21151403 dated May 10, 2021.
Italian Search Report of IT 202000000415 dated Sep. 2, 2020.

*Primary Examiner* — Nathanael T Zemui
(74) *Attorney, Agent, or Firm* — Mark M. Friedman

(57) ABSTRACT

Enveloping machine for enveloping plates for electric storage batteries, comprising a storage for storing plates for electric storage batteries, and a manipulation station for manipulating the plates, which comprises a gripping device for separately picking up the plates from the storage and for depositing them at an enveloping station, which also receives a separator strip in order to enclose the plates with the separator strip itself. In addition, the gripping device comprises a movable trolley actuated to translate between the storage and the enveloping station, and a rotary head mounted on the movable trolley and actuated to rotate between a grip position, in which it picks up the plates placed vertically in the storage, and a release position, in which it deposits the plates horizontally on the enveloping station.

12 Claims, 7 Drawing Sheets

ENVELOPING MACHINE FOR ENVELOPING PLATES FOR ELECTRIC STORAGE BATTERIES AND METHOD FOR MANIPULATING PLATES FOR ELECTRIC STORAGE BATTERIES IN SAID ENVELOPING MACHINE

FIELD OF THE APPLICATION

The present invention regards an enveloping machine for enveloping plates for electric storage batteries and a method for manipulating plates for electric storage batteries in said machine.

The present machine and its manipulation method are intended to be employed in the industrial plants for producing electric storage batteries, in particular for lead electric storage batteries.

More in detail, the present machine is adapted to envelope, with a separator strip, the plates for electric storage batteries, subsequently intended to form electrodes of cells of electric storage batteries.

The invention, therefore, is inserted in the context of the industrial field of production of lead electric storage batteries.

STATE OF THE ART

In the industrial field of production of lead electric storage batteries, it is known to collect in packs a plurality of plates for electric storage batteries that are superimposed on each other and subsequently organize each pack, with positive or negative polarity, within cells of box-like bodies, in which the various plates are embedded in an electrolytic solution for attaining the redox reactions necessary for producing electrical energy.

In particular, within each pack, the single plates are stacked on each other and are mechanically separated from each other by a separator body, generally made of plastic material (e.g. polyethylene) or glass fiber and adapted to allow the passage of electric charges between one plate and the next, once these are embedded in the electrolytic solution. In order to attain such packs of plates stacked on each other and mechanically separated from each other, enveloping machines are known for enveloping plates for electric storage batteries, which are adapted to at least partially enclose each plate with a separator strip, enveloping it within such separator strip, and subsequently are adapted to stack the enveloped plates according to a pre-established scheme, thus obtaining the aforesaid pack of plates.

In particular, the enveloping machines of known type are usually provided with an enveloping station fed with the separator strip and with a succession of plates for electric storage batteries to be enveloped. More in detail, the machines of known type comprise a first manipulation station which picks up the single plates from a storage and loads them on an enveloping station in a substantially horizontal position, upstream of the point at which the enveloping station itself is fed with the separator strip, which is made to slide substantially vertically.

Once loaded on the enveloping station, the various plates are made to slide horizontally along the enveloping station itself, where they intercept the separator strip and drive it along the horizontal motion thereof, bending it to enclose the plate and creating an envelope in which the plate itself is contained.

In addition, the machines of known type comprise a second manipulation station, which loads a second plurality of plates on the enveloping station, downstream with respect to the point at which the plates loaded by the first manipulation station intercept the separator strip, and in particular it loads the plates of such second plurality on top of the plates already enveloped by the enveloping station. In this manner, the second manipulation station attains a pack of two plates for electric storage batteries, stacked on each other and with one plate enveloped and the next not.

The enveloping machines for enveloping plates for electric storage batteries of known type described briefly up to know have in practice shown that they do not lack drawbacks.

In particular, the main drawback of such machines of known type lies in the fact that their manipulation stations are not sufficiently efficient for resupplying the enveloping station with high production speeds, and in particular with production speeds higher than 180 plates per minute. More in detail, in order to pick up the various plates from the storage and quickly release them on the enveloping station, the manipulation station is provided with a plurality of gripping elements actuated to act in succession, in which each element picks up a single plate from the storage and releases it at a conveyor belt of the enveloping station, which subsequently moves the plate towards the separator strip, freeing the place for the deposition of the subsequent plate.

In addition, so as to increase the production speed, the various gripping elements of the enveloping station quickly release the single plates on the conveyor belt of the enveloping station without accompanying them during the release step, but rather by allowing them to fall on the conveyor belt in an abrupt manner, for example bringing them to hit against an abutment element placed at the conveyor belt itself. Such release steps, executed in such an abrupt manner, have the disadvantage of involving a high risk of damaging the plates to be enveloped.

A further drawback of the enveloping machines for enveloping plates for electric storage batteries of known type lies in the fact that before being enveloped, the various plates must be brushed. More in detail, in order to ensure a good passage of the current charges, it is known to treat the external surface of the plates by means of a brushing operation, which is generally attained at a projecting section of the plates themselves.

The enveloping machines of known type are therefore generally also provided with a brushing station, interposed between the storage and the enveloping station, and provided with two counter-rotating rollers between which the section of each plate to be brushed is guided, so to pass through. More in detail, the enveloping machines of known type are generally provided with two conveyor belts, including a first conveyor belt of the brushing station which receives the plates from the gripping elements of the manipulation station and transports them up to two counter-rotating rollers, and a second conveyor belt of the enveloping station which picks up the plates from the brushing station and moves them towards the separator strip, as is described above. Therefore, within the enveloping machines of known type, the plates are manipulated multiple times during their passage from the storage to the enveloping station, with the consequent risk that the plates will be damaged with each new manipulation.

Presentation of the Invention

In this situation, the problem underlying the present invention is therefore that of overcoming the drawbacks manifested by the machines of known type by providing an enveloping machine for enveloping plates for electric storage batteries and a manipulation method thereof which are entirely efficient in operation.

A further object of the present invention is to attain an enveloping machine for enveloping plates for electric storage batteries and a manipulation method thereof which allow loading the plates on an enveloping station of the enveloping machine itself, maintaining them perfectly intact.

A further object of the present invention is to attain an enveloping machine for enveloping plates for electric storage batteries and a manipulation method thereof which allow quickly and continuously power supplying the enveloping station of the enveloping machine itself.

A further object of the present finding is to attain an enveloping machine for enveloping plates for electric storage batteries which is entirely effective and reliable in operation.

BRIEF DESCRIPTION OF THE DRAWINGS

The technical characteristics of the invention, according to the aforesaid objects, and the advantages thereof, will be more evident in the following detailed description, made with reference to the enclosed drawings, which represent a merely exemplifying and non-limiting embodiment of the invention, in which.

DETAILED DESCRIPTION OF A PREFERRED EMBODIMENT

With reference to the enclosed drawings, reference number 1 overall indicates an enveloping machine for enveloping plates for electric storage batteries, object of the present invention.

The present enveloping machine 1 is intended to be advantageously employed within a plant for producing electric storage batteries, in particular for lead electric storage batteries, and is intended to receive a plurality of plates P for electric storage batteries to be at least partially enclosed with a separator strip S.

According to the invention, the present enveloping machine 1 comprises a support structure 2 intended to be abutted against the ground and preferably made of metallic material, e.g. steel.

The present enveloping machine 1 also comprises a supply system 3 for supplying a separator strip S for electric storage batteries, which is preferably made of fibers of plastic material, e.g. polyethylene, or of glass fiber, which are weaved together to form a continuous strip.

Figure 1:
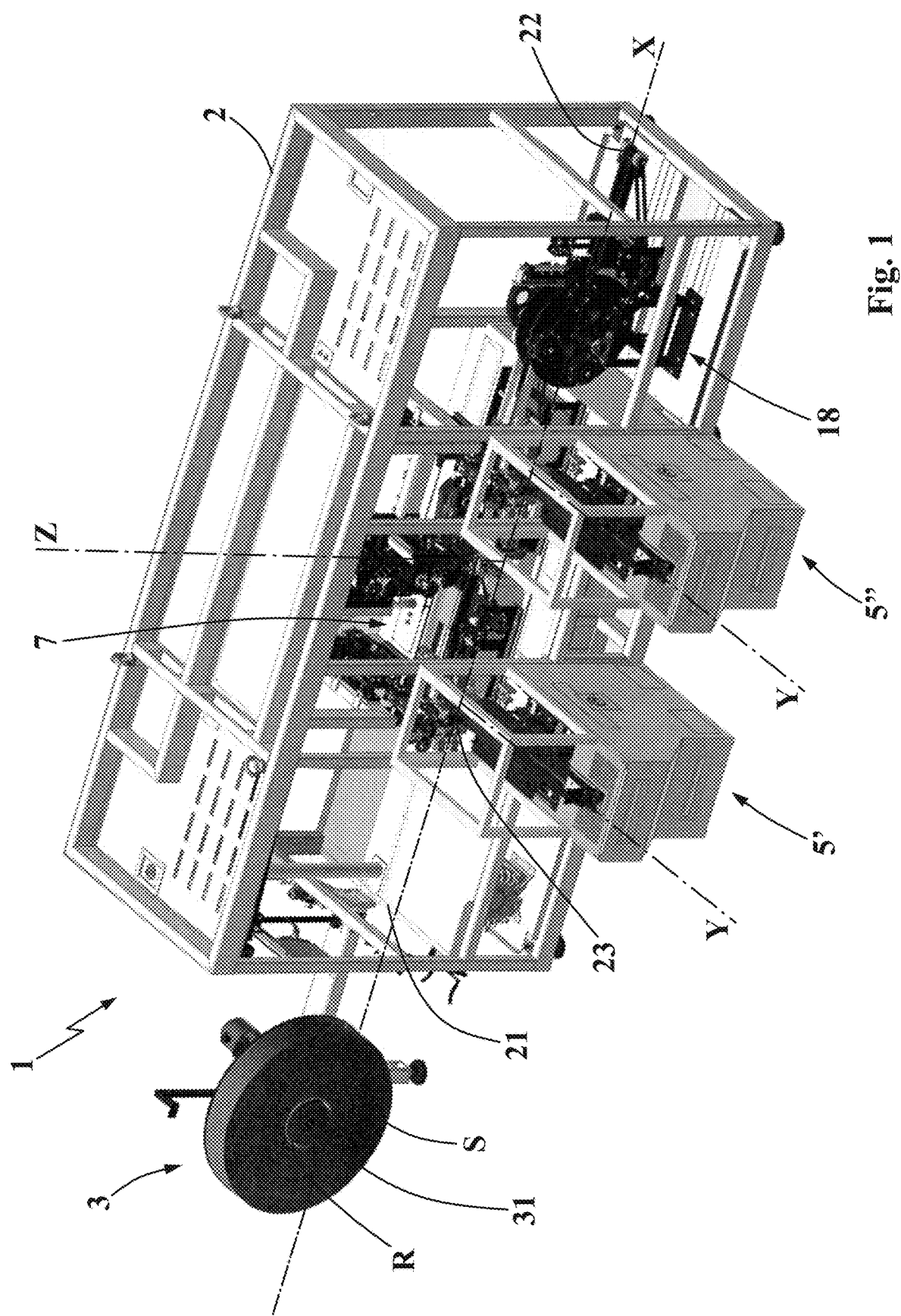
FIG. 1 shows a top perspective view of an enveloping machine for enveloping plates for electric storage batteries, object of the present invention.

In accordance with the preferred embodiment illustrated in the enclosed FIG. 1, the supply system 3 comprises a reel R carrying the separator strip S wound thereon and rotatably supported on the support structure 2 by means of a pin 31. Advantageously, moreover, the supply system 3 of the enveloping machine 1 can comprise multiple reels R, around which distinct separator strips S are wound, made of a same material or of materials different from each other, which are preferably intended to be employed by the enveloping machine 1 in different process steps.

According to the invention, the enveloping machine 1 also comprises a storage 4 susceptible of housing a plurality of plates P for electric storage batteries, intended to be enveloped by the enveloping machine 1 as is better described hereinbelow. In accordance with the preferred embodiment illustrated in the enclosed FIG. 1, moreover, the aforesaid storage 4 is preferably mounted on the support structure 2.

According to the invention, the enveloping machine 1 also comprises a manipulation station 5 for manipulating the plates P, which is preferably mounted on the support structure 2 and comprises a gripping device 6 adapted to separately pick up the plates P from the storage 4.

According to the invention, the enveloping machine 1 also comprises an enveloping station 7, mounted on the support structure 2 and susceptible of receiving the separator strip S and the plates P, in order to enclose them at least partially with the separator strip S itself. More in detail, the enveloping station 7 is susceptible of receiving the plates P from the gripping device 6 of the manipulation station 5 and is susceptible of receiving the separator strip S from the supply system 3. In addition, the enveloping station 7 is susceptible of moving the plates P, enveloped with the separator strip S, substantially up to a stacking station 18, adapted to stack together a plurality of plates P, as is better described hereinbelow.

In particular, in accordance with the preferred embodiment illustrated in the enclosed figures, the enveloping machine 1 is provided with a horizontal extension direction X between a first inlet port 21, in which it receives the separator strip S, and an outlet port 22, from which the plates P exit which are enveloped and stacked in packs of plates P superimposed on each other, as is better specified hereinbelow. Advantageously, moreover, the enveloping machine 1 is also provided with a second inlet port 23, in which it receives the plates P by means of the gripping device 6. In particular, in accordance with the preferred embodiment illustrated in the enclosed figures, the second inlet port 23 is placed at one of the enveloping machine 1, interposed between the first inlet port 21 and the outlet port 22.

Preferably, the storage 4 is extended, perpendicular to the horizontal extension direction X, between a first end 41, for loading the plates P, and a second end 42, for picking up the plates P, directed towards the enveloping station 7. Advantageously, moreover, the storage 4 is provided with at least one towing chain 43, extended between its first and second ends 41, 42 and on which the plates P are placed in abutment. In particular, such towing chain 43 is susceptible of being moved in order to tow the plates P from the first end 41 towards the second end 42 where they are susceptible of being picked up by the gripping device 6 of the manipulation station 5.

According to the problem underlying the present invention, the storage 4 is susceptible of housing the plates P placed substantially vertically, in succession one next to the other.

In addition, the gripping device 6 of the manipulation station 5 comprises at least one movable trolley 61 actuated to translate by means of a first actuator 8 between the storage 4 and the enveloping station 7 along a first movement direction Y, preferably horizontal and preferably perpendicular to the horizontal extension direction X of the enveloping machine 1. In addition, the gripping device 6 comprises at least one rotary head 62, rotatably mounted on the movable trolley 61 and actuated to rotate by means of a second actuator 9, preferably mounted on the movable trolley 61 and carrying the rotary head 62 itself mounted thereon.

The aforesaid second actuator 9 rotates the rotary head 62 between a grip position, in which it is susceptible of picking up the single plates P placed vertically in the storage 4, and a release position, in which it is susceptible of horizontally depositing the single plates P at the enveloping station 7.

In accordance with the preferred embodiment illustrated in the enclosed figures, the storage 4 is extended between the aforesaid first and second ends 41, 42 parallel to the first movement direction Y and is susceptible of housing the plates P with their lying planes placed substantially orthogonal to such first movement direction Y. Preferably, moreover, the plates P are placed in the storage 4 parallel to and in succession one after the other as well as in abutment against each other, so as to form an ordered array of plates P which is extended along the first movement direction Y. Advantageously, therefore, the plates P are placed in a manner such that a first plate P of the array of plates P is always placed at the second end 42 of the storage 4, available for the gripping device 6.

Figure 2:
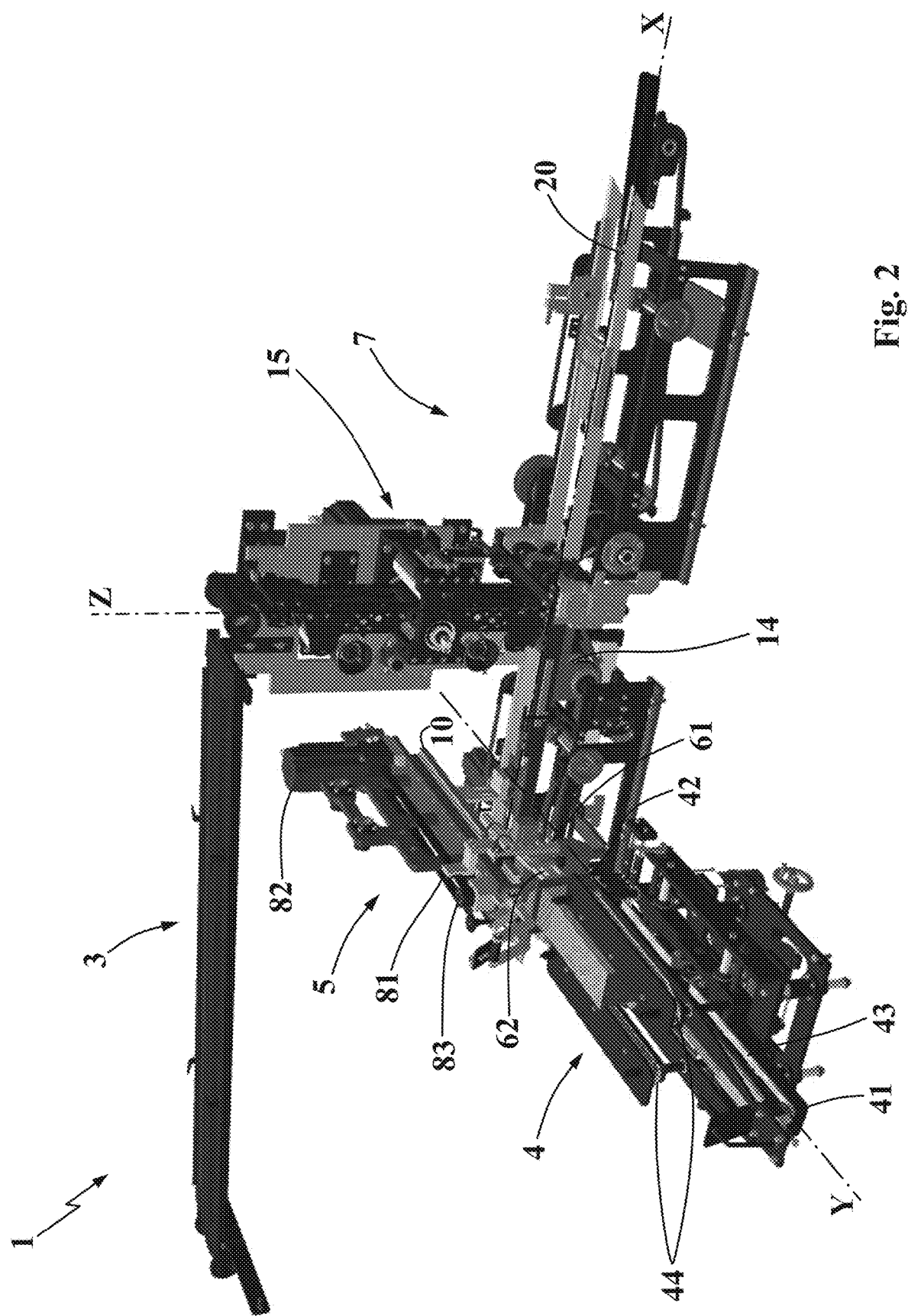
FIG. 2 shows a side perspective view of the enveloping machine for enveloping plates for electric storage batteries, object of the present invention, with several parts removed in order to better view other parts thereof.

As indicated above, the plates P are susceptible of being housed in the storage 4 in a substantially vertical position, i.e. they can be placed with their lying plane tilted with respect to the first movement direction Y by an angle comprised between 75° and 90°. In order to retain the plates P in such vertical (or substantially vertical) position, the storage 4 advantageously comprises two longitudinal guides 44 parallel to the first movement direction Y, against which two opposite lateral edges of the plates P are abutted, the plates which advance towards the enveloping station 7 (see the enclosed FIG. 2).

In accordance with the preferred embodiment illustrated in the enclosed figures, the manipulation station 5 is extended substantially horizontally between the storage 4 and the enveloping station 7. Preferably, moreover, the manipulation station 5 comprises a longitudinal guide 10 extended along the first movement direction Y and on which the movable trolley 61 of the gripping device 6 is slidably mounted.

In addition, in accordance with the preferred embodiment illustrated in the enclosed figures, the longitudinal guide 10 is placed at a height from the ground greater than the height of the storage 4 and carries the movable trolley 61 mounted thereon, such trolley projecting from such guide downward, with the rotary head 62 placed at the height of the storage 4 in its grip position. As mentioned above, in fact, the rotary head 62 is rotatably mounted on the movable trolley 61 and is susceptible of being rotated along an arc of circumference between the grip position, in which it is advantageously placed at the same height as the storage 4 in order to pick up the plates P, and the release position, in which it is advantageously placed at a height lower than the height of the storage 4, in particular in order to release the plates P on the enveloping station 7.

Advantageously, the first actuator 8 moves the movable trolley 61 along the aforesaid longitudinal guide 10 with an alternating motion between the storage 4 and the enveloping station 7, and vice versa. In particular, the enveloping machine 1 advantageously comprises a logic control unit 100 operatively connected to the first actuator 8 in order to drive them to move the movable trolley 61 in the aforesaid alternating motion, which preferably comprises at least one outgoing travel and one return travel along the first movement direction Y, and in such outgoing and return travels the movable trolley 61 slides along the longitudinal guide 10 in two opposite directions.

More in detail, in the aforesaid alternating motion, the logic control unit 100 drives the first actuator 8 to retain the movable trolley 61 in a first stop step at the storage 4, in which the gripping device 6 picks up the single plates P. Subsequently, the logic control unit 100 drives the first actuator 8 to move the movable trolley 61 in an outgoing travel along the first movement direction Y, from the storage 4 to the enveloping station 7. Subsequently, the logic control unit 100 drives the first actuator 8 to retain the movable trolley 61 in a second stop step at the enveloping station 7, in which the gripping device 6 releases the single plates P, preferably at a pre-established position. Finally, the logic control unit 100 drives the first actuator 8 to move the movable trolley 61 in a return travel along the first movement direction Y from the enveloping station 7 to the storage 4.

Subsequently, once the movable trolley 61 is once again at the storage 4, the logic control unit 100 advantageously drives the first actuator 8 to move the movable trolley 61 in new alternating motion, in which the gripping device 6 picks up a new plate P during the aforesaid first stop step.

Figure 3:
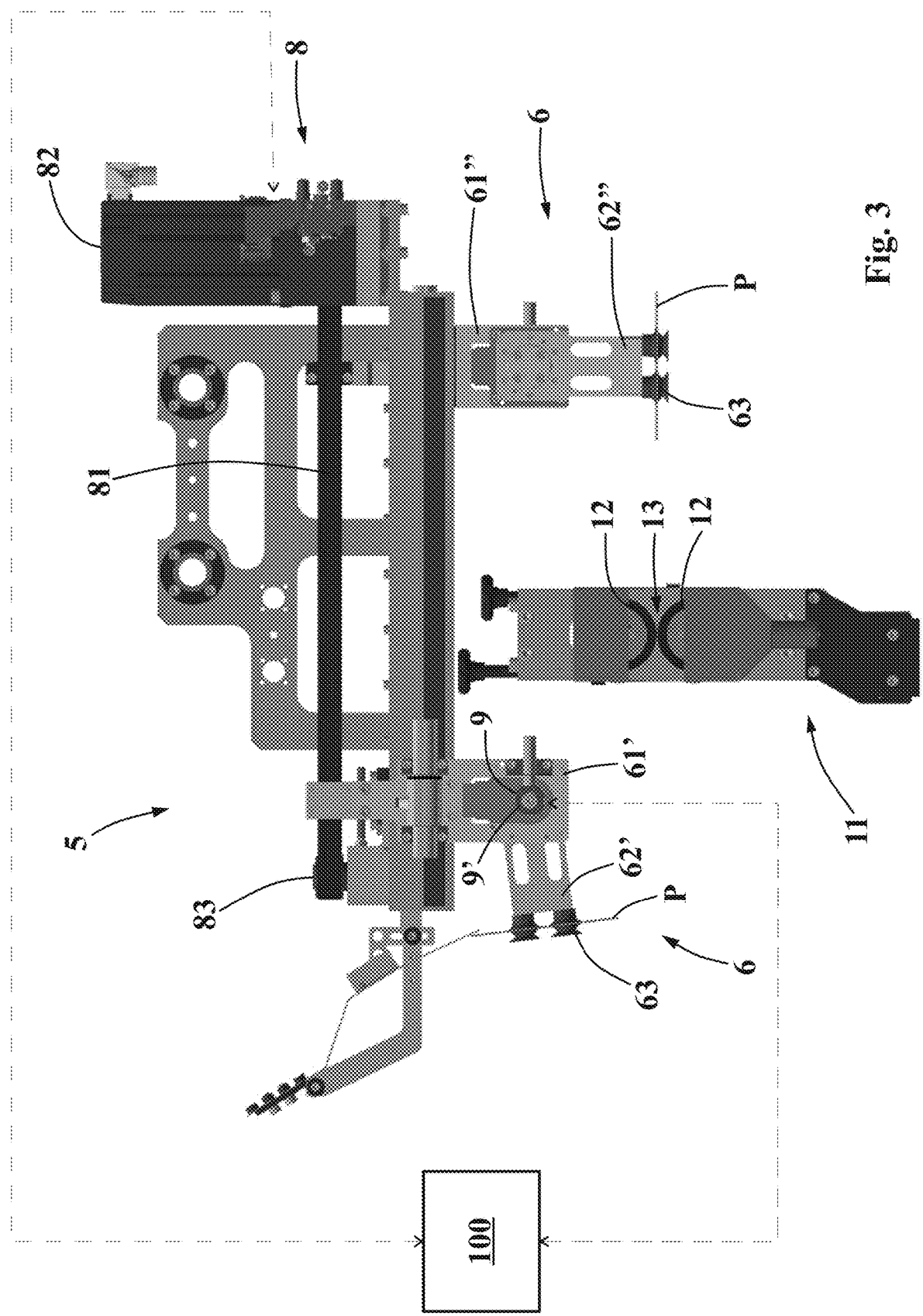
FIG. 3 shows a side view of a manipulation station and of a brushing station of the enveloping machine for enveloping plates for electric storage batteries, object of the present invention.

In accordance with the preferred embodiment illustrated in the enclosed FIG. 3, the first actuator 8 advantageously comprise a movement belt 81, wound as a ring between at least one motorized roller 82 and an idle roller 83 and carrying the movable trolley 61 fixed thereto. Preferably, in addition, the motorized roller 82 and the idle roller 83, are provided with two rotation axes parallel to each other, placed substantially perpendicular to the first movement direction Y and preferably placed respectively at the enveloping station 7 and at the storage 4.

As indicated above, the enveloping machine 1 is also provided with second actuator 9 adapted to rotate the rotary head 62 between the grip position and the release position. More in detail, such second actuator 9 preferably comprises a rotary motor 9', which is mounted on the movable trolley 61 of the gripping device 6 and preferably carries the rotary head 62 mounted thereon in order to drive it in rotation. For example, the rotary motor 9' of the second actuator 9 comprises an electric motor and a pinion, which is fit on the electric motor and is mechanically coupled to a toothed wheel of the rotary head 62, so as to rotate the rotary head 62.

Advantageously, moreover, as mentioned above, the rotary head 62 rotates between the aforesaid grip and release positions along an arc of circumference, in which the center of the circumference is placed substantially at the point in which the rotary head 62 is mounted on the movable trolley 61, and with the arc of circumference which covers a circular sector that is wide substantially 90°.

Advantageously, moreover, as indicated above, the grip position and the release position of the rotary head 62 are placed at two different heights and preferably the grip position is placed at a height higher than the height of the release position, as illustrated in FIG. 3.

Advantageously, the aforesaid logic control unit 100 is operatively connected also to the second actuator 9 in order to drive the rotation of the rotary head 62 from the grip position to the release position with the movable trolley 61 moved along the outgoing travel of its alternating motion.

Preferably, the logic control unit 100 drives the second actuator 9 also to retain the rotary head 62 in the release position with the movable trolley 61 retained in the second stop step. In addition, the logic control unit 100 preferably drives the second actuator 9 to rotate the rotary head 62 from the release position to the grip position, with the movable trolley 61 moved along the return travel. Preferably, moreover, the logic control unit 100 drives the second actuator 9 to retain the rotary head 62 in the grip position with the movable trolley 61 retained in the first stop step. In other words, therefore, the logic control unit 100 drives the second actuator 9 to move the rotary head 62 while the first actuator 8 moves the movable trolley 61.

Preferably, in addition, in the outgoing travel, the logic control unit 100 drives the first and the second actuators 8, 9 in two different time instants. More in detail, the logic control unit 100 is advantageously programmed to send, in a first time instant, a first drive signal to the first actuator 8 in order to move the movable trolley 61. In addition, it is programmed to send, in a second time instant, following the first time instant, a second drive signal to the second actuator 9 in order to rotate the rotary head 62 from the grip position to the release position with the movable trolley 61 placed in a position interposed between the storage 4 and the manipulation station 7. Preferably moreover, in the return travel, the logic control unit 100 drives the first and the second actuators 8, 9 substantially simultaneously. More in detail, the logic control unit 100 is advantageously programmed for sending a third drive signal to the first actuator 8 in order to move the movable trolley 61 and in order to send, substantially simultaneously, a fourth drive signal to the second actuator 9 in order to rotate the rotary head 62 from the release position to the grip position.

In accordance with the preferred embodiment illustrated in the enclosed figures, the gripping device 6 comprises two movable trolleys 61 and preferably comprise two rotary heads 62, each rotatably mounted on a corresponding movable trolley 61. More in detail, the gripping device 6 comprises a first movable trolley 61' and a second movable trolley 61", and the first actuator 8 is adapted to position the first movable trolley 61' at the storage 4 with the second movable trolley 61" positioned at the enveloping station 7 and vice versa.

In particular, the longitudinal guide 10 is advantageously provided with two lateral rails, parallel to the first movement direction Y and respectively fixed to two opposite sides of the longitudinal guide Y. Advantageously, moreover, each movable trolley 61', 61" is slidably mounted on a corresponding rail of the two rails and laterally projects from such rail, in a manner such to slide along the corresponding rail between the storage 4 and the enveloping station 7 without intercepting the other movable trolley 61.

Advantageously, moreover, the first actuator 8 moves each movable trolley 61 with a corresponding alternating motion in which, when the first movable trolley 61' is retained in the first stop step, the second movable trolley 61" is retained in the second stop step and vice versa. Consequently, moreover, when the first movable trolley 61' is moved in the outgoing travel, the second movable trolley 61" is moved in the return travel and vice versa.

In this manner, the gripping device 6 provided with two movable trolleys 61 advantageously allows the manipulation station 5 to double the number of plates P that can be deposited on the enveloping station 7, with respect to the number of plates P that can be deposited on only one movable trolley 61.

As indicated above, the gripping device 6 preferably comprises also a first rotary head 62' rotatably mounted on the first movable trolley 61' and actuated to rotate between the grip and release positions by means of a first rotary motor of the second actuator 9. Preferably, moreover, the gripping device 6 also comprises a second rotary head 62" rotatably mounted on the second movable trolley 61" and actuated to rotate between the grip and release positions by means of a second rotary motor of the second actuator 9. In accordance with the preferred embodiment of the present invention, illustrated in the enclosed FIG. 3, the gripping device 6 also comprises at least one sucker 63, and preferably four suckers 63, mounted on each rotary head 62 and susceptible of picking up and retaining each plate P by means of suction.

More in detail, the gripping device 6 preferably comprises a Venturi tube provided with a narrowing connected to the suckers 63. Advantageously, moreover, the gripping device 6 also comprises a compressed air generator connected to the Venturi tube in order to move, at its interior, an air flow which, at the narrowing of the Venturi tube, creates a reduced pressure that suctions the air present between the suckers 63 and the surface of the plate P to be picked up, creating the vacuum and allowing the suckers 63 to pick up and retain the plate P.

Advantageously, the suckers 63 are also susceptible of releasing each plate P at the enveloping station 7. In particular, in order to release the plates P it is sufficient to interrupt the passage of the air flow through the Venturi tube, thus reducing the reduced pressure at the narrowing. Therefore, for such purpose the gripping device 6 is advantageously provided with a solenoid valve placed at the outlet from the compressed air generator and adapted to interrupt the passage of the air flow from the compressed air generator to the Venturi tube. In particular, the aforesaid solenoid valve is advantageously driven to open and close by the electronic control unit, which is programmed in order to drive the suction of the air comprised between the suckers 63 and the plate P with the movable trolley 61 in the first stop step. In addition, the logic control unit 100 drives the solenoid valve to open for the entire outgoing travel of the movable trolley 61, so as to retain the plate P until the movable trolley 61 reaches the enveloping station 7. Advantageously, therefore, when the movable trolley 61 is in its second stop step, the logic control unit 100 drives the solenoid valve to close so as to interrupt the passage of the air flow through the Venturi tube and release the plate P. In this manner, it is thus advantageously possible to determine the exact position in which the plates P are released on the enveloping station 7.

Advantageously, moreover, the gripping device 6 thus attained allows exploiting the two stop steps of the two movable trolleys 61', 61" in order to allow the suckers 63 to delicately pick up and release the plates P, thus preventing such plates P from sustaining impact which could damage them. More in detail, it is possible to exploit the time necessary for the suckers 63 mounted on the first rotary head 62' in order to pick up a first plate P during the first stop step of the first movable trolley 61', in order to allow the suckers 63 mounted on the second rotary head 62" to delicately release a second plate P, accompanying it on the enveloping station 7 during the second stop step of the second movable trolley 61".

In accordance with the preferred embodiment illustrated in the enclosed figures, the enveloping machine 1 also comprises a brushing station 11 of a projecting section of the plates P, which is preferably mounted on the support structure 2 interposed between the storage 4 and the enveloping station 7. Advantageously, moreover, the brushing station 11 comprises two counter-rotating rollers 12, spaced from each other by a passage slit 13 which is extended along the first movement direction Y. In addition, the gripping device 6 is advantageously adapted to retain each plate P during its movement between the storage 4 and the enveloping station 7 with the corresponding projecting section which intercepts the passage slit 13 in order to be brushed by the two counter-rotating rollers 12.

In accordance with the preferred embodiment illustrated in the enclosed FIG. 3, the two counter-rotating rollers 12 are placed in a position below the longitudinal guide 10, with their rotation axes parallel to each other and perpendicular to the first movement direction Y. Advantageously, moreover, the two movable trolleys 61', 61" of the gripping device 6 is mounted on the two rails on the longitudinal guide 10 laterally projecting with respect to such rails and spaced from each other, transversely with respect to the first movement direction Y, by a distance at least equal to the bulk of the two counter-rotating rollers 12. In this manner, therefore, the two movable trolleys 61', 61" are free to slide along the longitudinal guide 10 without intercepting the two counter-rotating rollers 12 of the brushing station 11. Advantageously, moreover, the suckers 63 are adapted to retain each plate P with the projecting section protruding beyond the bulk of the suckers 63, and preferably beyond the bulk of the rotary head 62, in a manner such that only the projecting section intercepts the passage slit 13 (as is illustrated in the enclosed FIG. 4). Advantageously, therefore, each plate P is susceptible of being retained by the gripping device 6 along the entire path from the storage 4 to the enveloping station 7, and is susceptible of being retained also during the passage of its projecting section through the passage slit 13 of the brushing station 11.

The aforesaid arrangement of the gripping device 6 and of the brushing station 11 thus allows not having to manipulate the plates multiple times during their transfer from the storage 4 to the enveloping station 7 and therefore allows preventing possible impact which can damage the plates P.

In accordance with the preferred embodiment illustrated in the enclosed figures, the enveloping station 7 of the enveloping machine 1 comprises a first conveyor belt 14 susceptible of receiving the plates P moved by the gripping device 6.

In particular, the first conveyor belt 14 is wound as a ring around at least one pair of actuator rollers 19, of which at least one is motorized, so as to drive in rotation the first conveyor belt 14 in order to move the plates P along the extension direction X from the second inlet port 23 of the enveloping machine 1 towards the outlet port 22.

Advantageously, moreover, the first conveyor belt 14 is moved with a continuous movement around the pair of actuator rollers 19 and is provided with at least one outgoing travel, extended between the aforesaid pair of actuator rollers 19 along the horizontal extension direction X of the enveloping machine 1, and with a return travel complementary to the outgoing travel and preferably extended at a lower height with respect to the height of the outgoing travel.

More in detail, the outgoing travel of the first conveyor belt 14 is extended between an initial end, susceptible of receiving the plates P and preferably placed at the second inlet port 23 of the enveloping machine 1, and a final end, interposed between the second inlet port 23 and the outlet port 22. Preferably, moreover, the outgoing travel is placed at a height from the ground lower than the height of the storage 4 and still more preferably lower also with respect to the height at which the rotary head 62 retains the plates P in the release position, in order to prevent the plates P from hitting the conveyor belt 14 itself.

Preferably, moreover, the plates P are intended to be released in abutment against the outgoing travel of the first conveyor belt 14 and are placed with their lying plane parallel to the horizontal extension direction X and still more preferably placed with two lateral edges thereof parallel to the horizontal extension direction X. Preferably, moreover, the plates P are intended to be released on the first conveyor belt 14 with a front edge thereof and a rear edge thereof placed perpendicular to the horizontal extension direction X, of which the front edge is directed in the same direction as the movement direction of the outgoing travel of the first conveyor belt 14 and the rear edge is directed in the opposite direction. Preferably, the plates P are placed with their projecting section protruding beyond the aforesaid rear edge.

Figure 5:
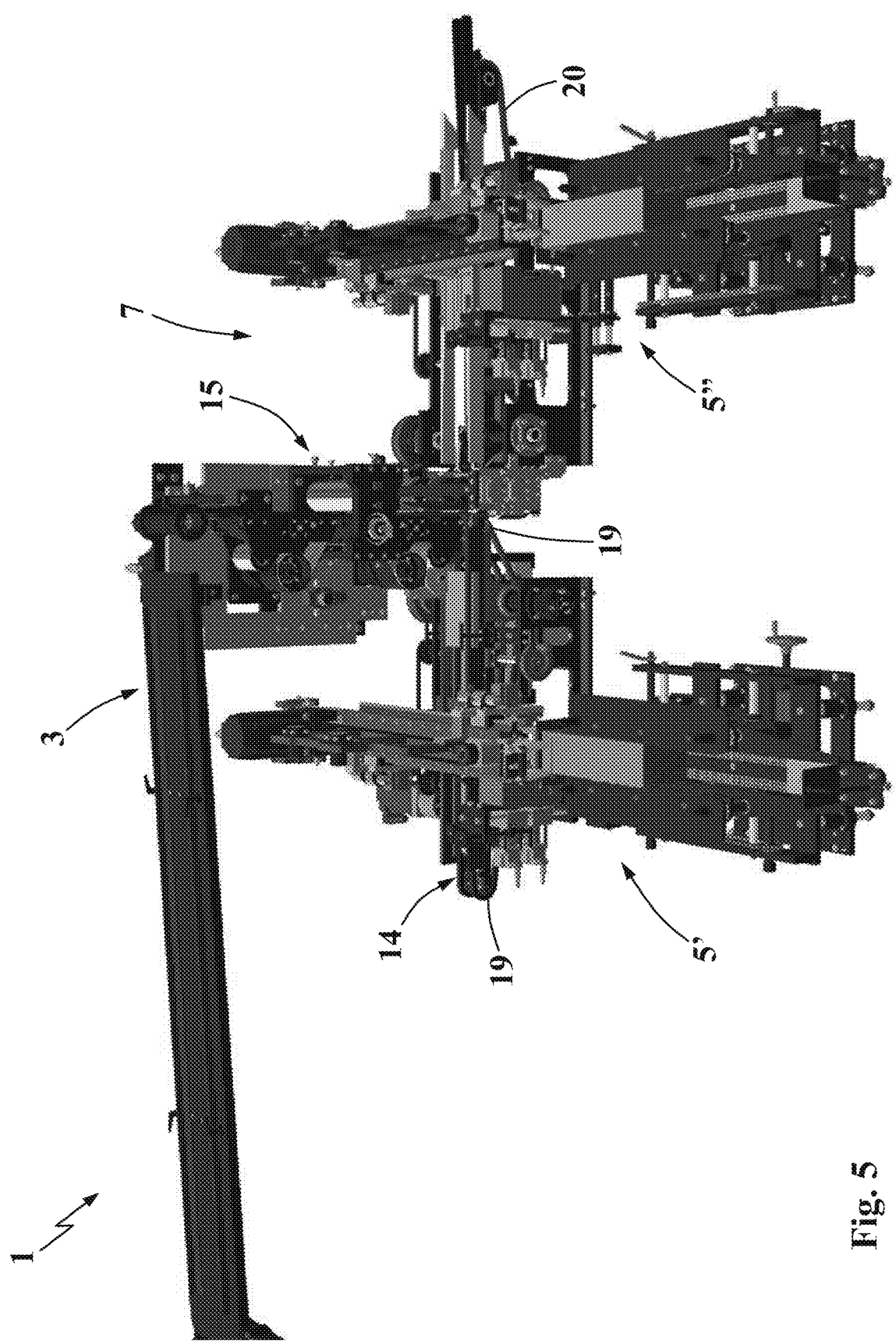
FIG. 5 shows a further top perspective view of the enveloping machine for enveloping plates for electric storage batteries, object of the present invention, with several parts removed in order to better view other parts thereof.
Figure 6:
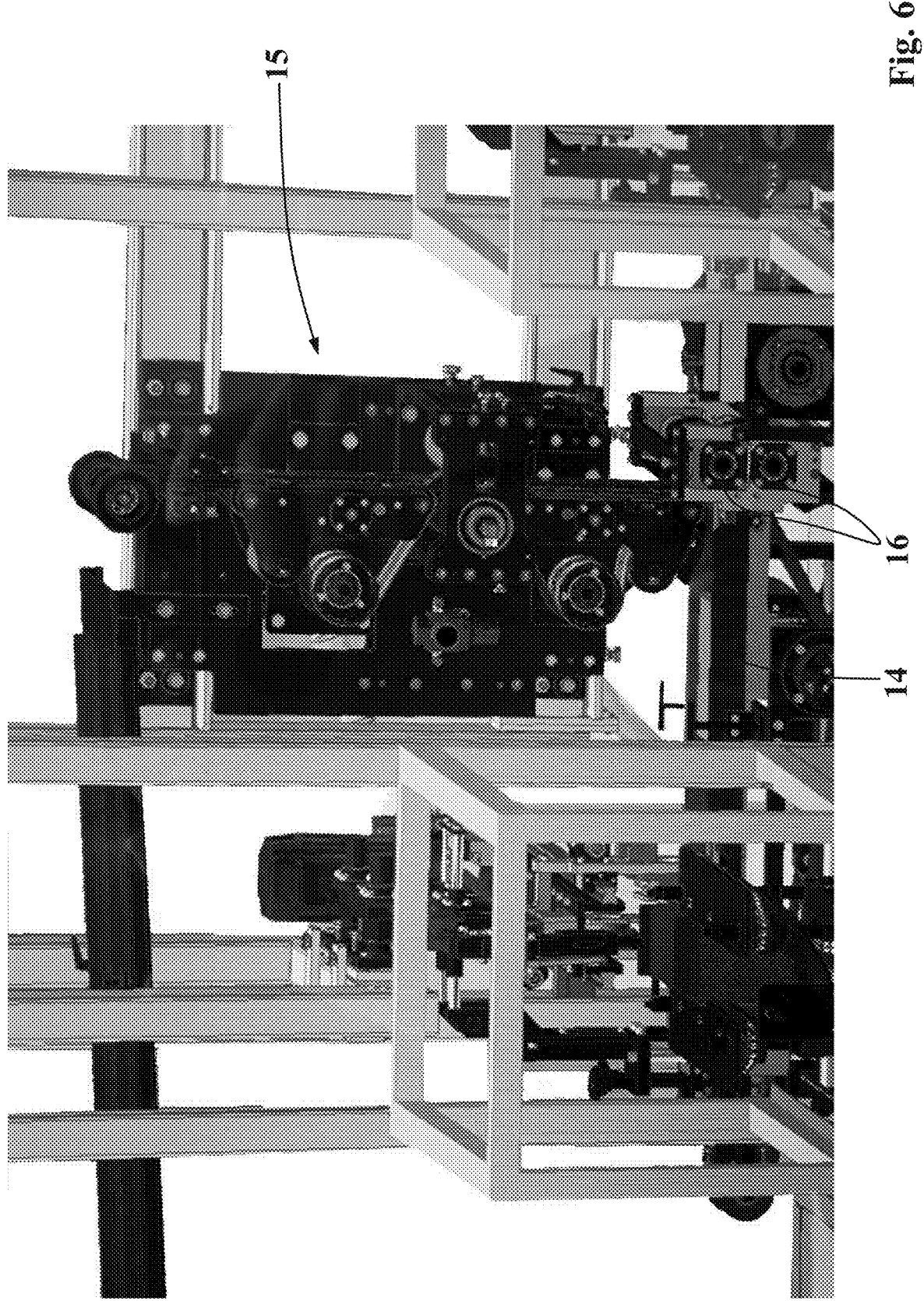
FIG. 6 shows a front view of an enveloping station of the enveloping machine for enveloping plates for electric storage batteries, object of the present invention.
Figure 7:
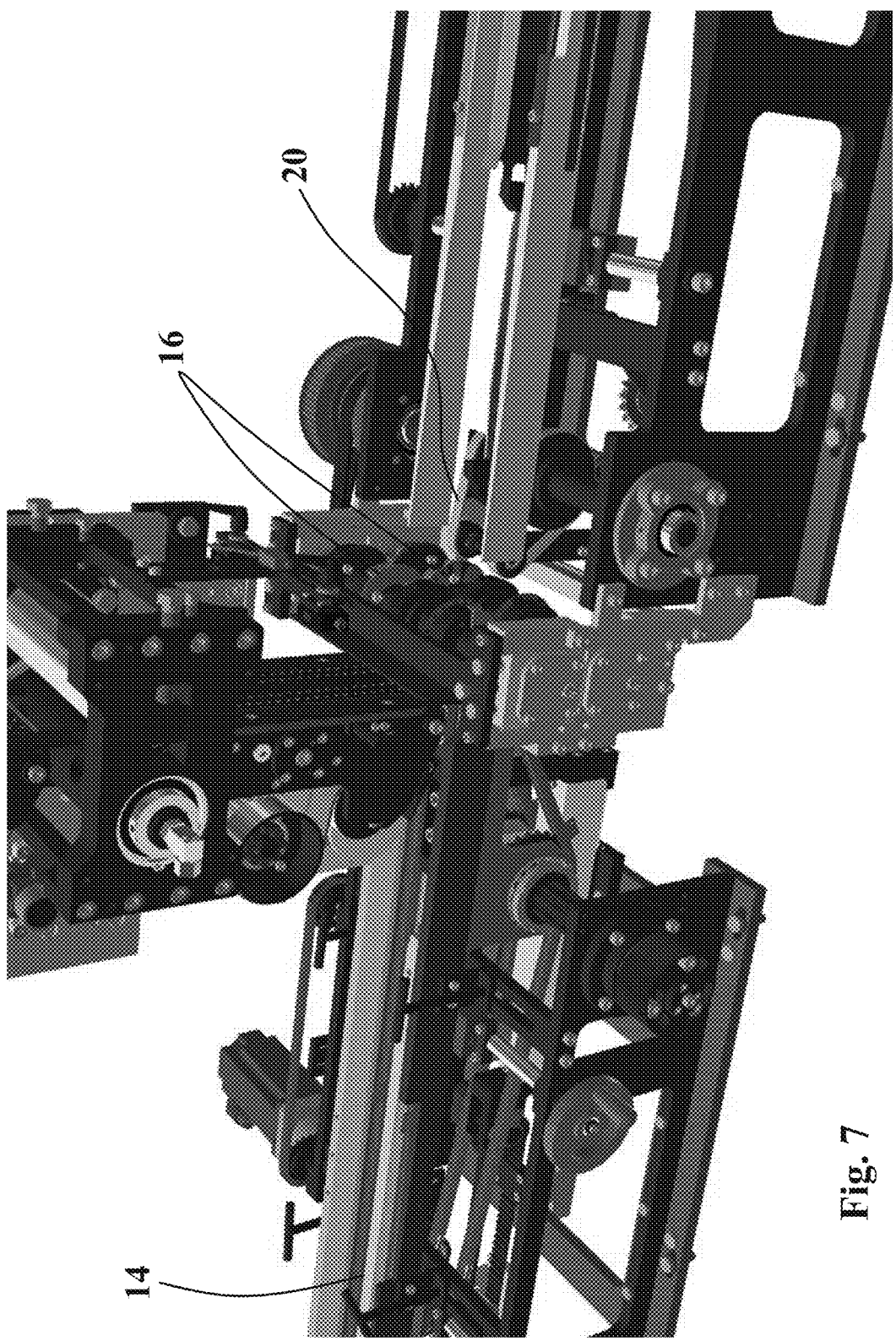
FIG. 7 shows a top perspective view of the enveloping station of FIG. 6, with several parts removed in order to better view other parts thereof.

As indicated above, the enveloping station 7 of the enveloping machine 1 is fed with the separator strip S by means of the supply system 3. In particular, the supply system 3 is provided with a plurality of guide rollers (see for example the enclosed FIGS. 2, 5 and 6) interposed between the reel R and the enveloping station 7 and adapted to guide the separator strip S to intercept the horizontal extension direction X along which the plates P are moved. Advantageously, the separator strip S is guided to intercept the horizontal extension direction X, being moved along a second movement direction Z, substantially orthogonal to the horizontal extension direction X, preferably vertical and still more preferably directed from top to bottom. Preferably, moreover, the supply system 3 moves the separator strip S to intercept the horizontal extension direction X at the final end of the outgoing travel of the first conveyor belt 14.

The enveloping station 7 is also advantageously provided with a cutting system 15 for cutting the separator strip S, which intercepts the separator strip S which is moved along the second movement direction Z and cuts it into segments, for example by means of a rotary blade. In particular, each segment of the separator strip S is advantageously provided with a length (measured along the second movement direction Z) substantially equal to double the length of the plates P (measured along the horizontal extension direction X), so as to be able to substantially enclose the two main faces of each plate P, enveloping it.

Advantageously, moreover, the enveloping station 7 is also provided with a second conveyor belt, interposed between the cutting system 15 and the first conveyor belt 14, and adapted to guide each segment of the separator strip S to intercept the horizontal extension direction X.

The enveloping station 7 is also advantageously provided with a pair of driving rollers 16 that are counter-rotating with respect to each other and placed at the point of interception of the separator strip S with the horizontal extension direction X.

In addition, the two driving rollers 16 are advantageously separated from each other by a second passage slit, which is extended along the horizontal extension direction X, and through which the plates P downstream of the first conveyor belt 14 are guided to pass through. Therefore, in operation, the first conveyor belt 14 moves the plates P up to its final end, where the plates P intercept the corresponding segment of separator strip S, moved by the second conveyor belt. Preferably, moreover, the first conveyor belt 14 moves the plates P also beyond the point of interception with the separator strip S, driving the plates P and the separator strip S itself through the second passage slit between the two driving rollers 16 which further drive the plates P and the segment of separator strip S, which is folded substantially 90° and is brought to slide along the horizontal extension direction X, in abutment against the plate P.

Advantageously, moreover, the first conveyor belt 14 and the second conveyor belt of the enveloping station 7 are suitably phased from each other in order to move the plates P and the segments of separator strip S with two speeds such to bring each plate P to intercept the segment of separator strip S substantially at the midpoint of its length (along the second movement direction Z). Advantageously, therefore, each segment of separator strip S is susceptible of being folded in two halves with the plate P interposed between such halves. Consequently, downstream of the two driving rollers 16, each segment of separator strip S is wound around the two main faces of the plate P and around its front edge.

Advantageously, the enveloping station 7 is also provided with a cold welding device for welding the segment of separator strip S (e.g. two seaming rollers), which i mounted on the enveloping station 7 preferably at the two driving rollers 16, laterally with respect to the latter, and it is adapted to act on the two lateral edges of each plate P, welding together the two halves of the segment of separator strip S which laterally project beyond such lateral edges of the plate P. In other words, therefore, the cold welding device is adapted to attain an envelope of separator strip S wound around the plate P and closed at its two lateral edges and at the front edge.

In accordance with the preferred embodiment, illustrated in the enclosed FIG. 1, the enveloping machine 1 is advantageously provided with two storages 4 and with two manipulation stations 5, preferably equivalent to each other. In particular, a first manipulation station 5' is adapted to deposit the plates P on the first conveyor belt 14, as is described above, and a second manipulation station 5" is adapted to deposit the plates P on a third conveyor belt 20 of the enveloping station 7, extended along the horizontal extension direction X downstream with respect to the driving rollers 16.

Advantageously, the second manipulation station 5" is adapted to deposit each plate P on top of a corresponding plate P deposited by the first manipulation station 5' and already enveloped by the driving rollers and by the cold welding device. In this manner, the second manipulation station 5" attains a first pack of two plates P, stacked on each other and in which the lower plate P is enveloped and the other plate is not.

Advantageously, moreover, the present enveloping machine 1 is also provided with a stacking station 18, placed downstream of the third conveyor belt 20 of the enveloping station 7 and susceptible of receiving the first pack of plates P stacked. Advantageously, moreover, the stacking station 18 is adapted to receive a plurality of first packs of plates P and is adapted to stack together such first packs so as to make a second pack of plates P comprising a plurality of enveloped plates P, spaced by a plurality of plates P that are not enveloped.

In particular, the aforesaid stacking station 18 advantageously comprises a big wheel, placed downstream of the enveloping station 7 and adapted to receive the aforesaid first packs of plates P from the third conveyor belt 20. Preferably, moreover, the aforesaid big wheel is provided with a plurality of abutment bases, each of which is susceptible of receiving a corresponding first pack of plates P. Advantageously, moreover, the big wheel is adapted to rotate, by bringing the first packs placed on each abutment base at a fourth conveyor belt of the stacking station 18, placed downstream of the big wheel, and depositing such first packs of plates P one on top of the other so as attain the second pack of plates P.

Also forming the object of the present invention is a method for manipulating plates for electric storage batteries in an enveloping machine of the above-described type and regarding which, for the sake of description simplicity, the same reference nomenclature will be employed.

According to the problem underlying the present invention, the present manipulation method comprises a pick-up step in which the gripping device 6 of the manipulation station 5 pick up the single plates P placed substantially vertically from the storage 4.

The present method then provides for a manipulation step, in which the first actuator 8 moves the movable trolley 61 from the storage 4 to the enveloping station 7, and the second actuator 9 moves the rotary head 62 from the grip position, in which the plates P are placed substantially vertically, to the release position, in which the plates P are placed horizontally.

The present method then provides for a release step in which the gripping device 6 horizontally deposits the single plates P at the enveloping station 7.

More in detail, the aforesaid pick-up step of the single plates P preferably occurs at the first stop step of the alternating motion of each movable trolley 61 of the gripping device 6. In particular, in such pick-up step the movable trolley 61 is placed at the storage 4 and more in detail is placed at its second end 42.

In such pick-up step, moreover, the rotary head 62 is advantageously retained in the grip position by the second actuator 9, by bringing the suckers 63 of the gripping device 6 in abutment against the main face of the first place P available in the storage 4.

In such pick-up step, therefore, the solenoid valve of the gripping device 6 is advantageously driven to open in order to allow the movement of the air flow through the Venturi tube, suctioning the air present between the suckers 63 and the plate P and picking up the plate P itself.

Advantageously, moreover, once the plate P is picked up, the aforesaid manipulation step starts, in which the first actuator 8 moves the movable trolley 61 at the enveloping station 7 and the second actuator 9 moves the rotary head 62 from the grip position to the release position.

Preferably, moreover, the first actuator 8 starts the movement of the movable trolley 61 in a first time instant and subsequently, after a pre-established time interval, the second actuator 9 starts the rotation of the rotary head 62. In this manner, the rotary head 62 is rotated while the movable trolley 61 has already start to advance towards the enveloping station 7, i.e. it is moved when the movable trolley 61 is separated from the storage 4, thus avoiding bringing the plate P retained by the suckers 63 to hit against the plates P still placed in the storage 4 itself.

Figure 4:
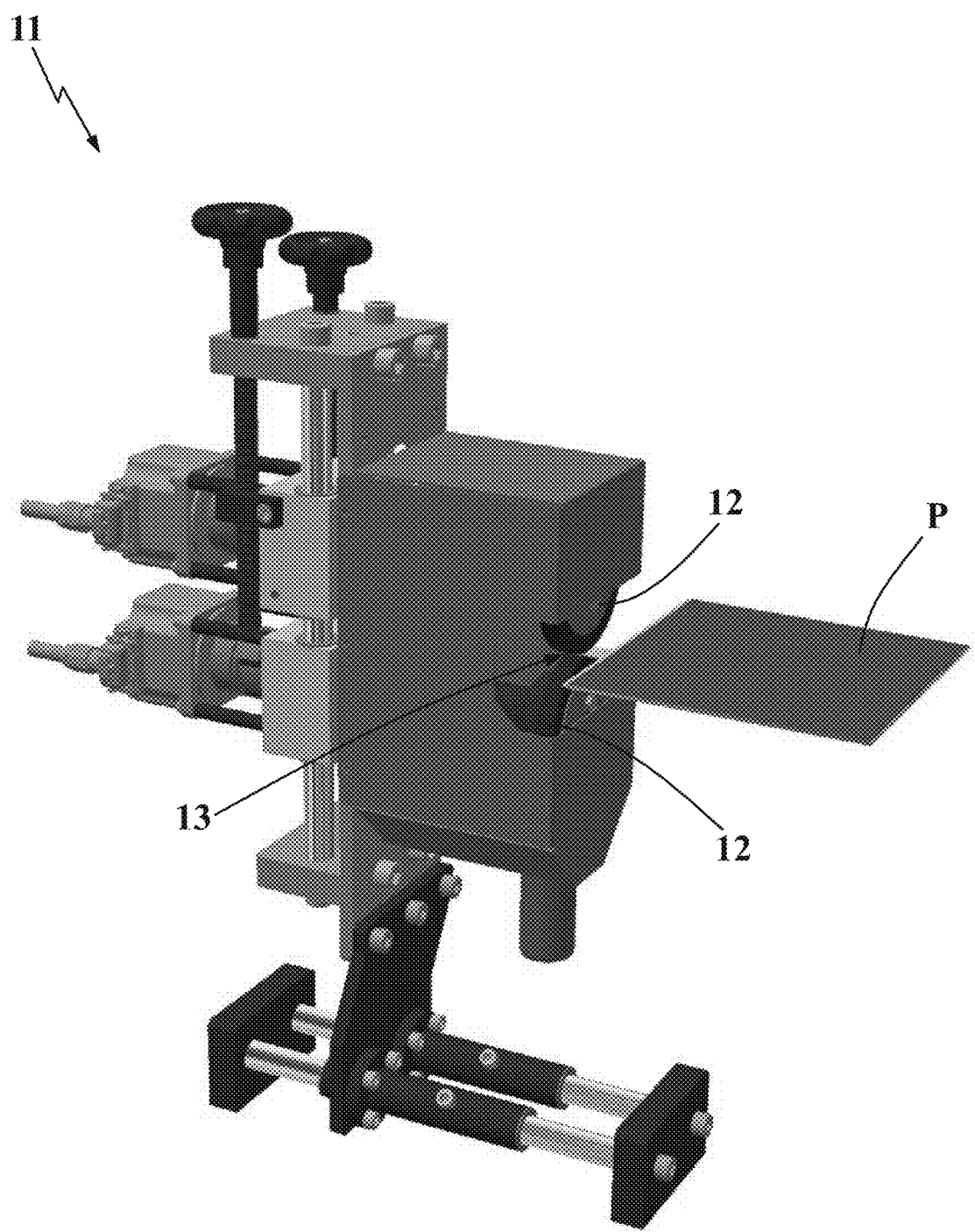
FIG. 4 shows a perspective view of a brushing station of the enveloping machine for enveloping plates for electric storage batteries, object of the present invention, in which a step is represented for brushing the projecting section of a plate for electric storage batteries, advantageously provided for in the manipulation method, object of the present invention.

Preferably, during the manipulation step, each plate P is also guided to pass with its projecting section through the passage slit 13 between the two counter-rotating rollers 12 of the brushing station 11, in order to brush such projecting section (as is illustrated in FIG. 4).

Advantageously, moreover, following the manipulation step, the aforesaid release step start, which preferably occurs at the second stop step of the alternating motion of each movable trolley 61 of the gripping device 6. In particular, in such release step the movable trolley 61 is placed at the enveloping station 7 and the rotary head 62 is advantageously retained in the release position with the plates P placed horizontally.

Advantageously, moreover, in the release step the movable trolley 61 is placed at the first end of the outgoing travel of the first conveyor belt 14 and the plate P is preferably delicately released in abutment against the first conveyor belt 14. More in detail, when the movable trolley 61 is in its second stop step, the logic control unit 100 drives the solenoid valve to close in order to interrupt the movement of the air flow through the Venturi tube of the gripping device 6, release the plate P. Advantageously, in such release step, the suckers 63 are deformed by accompanying the plate P which falls via gravity up to being deposited on the first conveyor belt 14 of the enveloping station 7. In this manner it is therefore possible to load the plates P delicately on the enveloping station 7, preventing impact which can damage the plates P themselves.

Advantageously, the present method then provides for a return step, in which the first actuator 8 moves the movable trolley 61 once again towards the storage 4 and the second actuator 9 rotates the rotary head 62 from the release position to the grip position, in order to be able to advantageously start, following such return step, a new pick-up step for picking up a plate P.

Advantageously, moreover, the present manipulation method, provides that the pick-up and release steps are executed in an alternating manner with respect to each other by each movable trolley 61 and rotary head 62 of the gripping device 6 of the machine 1. More in detail, when the first movable trolley 61' and the first rotary head 62' execute the pick-up step, the second movable trolley 61" and the second rotary head 62" execute the release step and vice versa. Advantageously, moreover, when the first movable trolley 61' and the first rotary head 62' execute the step for manipulating each plate P, the second movable trolley 61" and the second rotary head 62" execute the return step and vice versa.

The enveloping machine 1 thus conceived and its manipulation method therefore attain the pre-established objects.

The contents of the Italian patent application number 102020000000415, from which this application claims priority, are incorporated herein by reference.

The invention claimed is:

1. An enveloping machine for enveloping plates for electric storage batteries, the enveloping machine comprising:
   a support structure intended to be abutted against the ground;
   a supply system for supplying a separator strip;
   a storage susceptible of housing a plurality of plates for electric storage batteries;
   a manipulation station for manipulating the plates, which comprises a gripping device configured to separately pick up the plates from said storage;
   an enveloping station mounted on said support structure and susceptible of receiving the plates from said gripping device and of receiving the separator strip from said supply system in order to enclose each plate with the separator strip;
wherein said storage is susceptible of housing said plates placed vertically in succession one next to the other;
wherein said gripping device comprising:
   at least one movable trolley actuated to translate, by means of a first actuator, between said storage and said enveloping station along a first movement direction;
   at least one rotary head rotatably mounted on said movable trolley and actuated to rotate, by means of a second actuator, between a grip position, in which said rotary head is susceptible of picking up each plate vertically placed in said storage, and a release position, in which said rotary head is susceptible of horizontally depositing each plate at said enveloping station.

2. The enveloping machine of claim 1, wherein said manipulation station comprises a longitudinal guide which is extended along said first movement direction and on which said movable trolley is slidably mounted, wherein said movable trolley is moved by said first actuator in an alternating motion between said storage and said enveloping station.

3. The enveloping machine of claim 2, further comprising a logic control unit operatively connected to said first actuator in order to drive the movement of said movable trolley in alternating motion, wherein said logic control unit drives:
   said first actuator to retain said movable trolley in a first stop step at said storage, in which said gripping device picks up each plate;
   said first actuator to move said movable trolley in an outgoing travel along said first movement direction from said storage to said enveloping station;
   said first actuator to retain said movable trolley in a second stop step at said enveloping station, in which said gripping device releases each plate;
   said first actuator to move said movable trolley in a return travel along said first movement direction from said enveloping station to said storage.

4. The enveloping machine of claim 3, wherein said logic control unit is operatively connected to said second actuator in order to drive the rotation of said rotary head from said release position to said grip position with said movable trolley in said return travel.

5. The enveloping machine of claim 3, wherein said logic control unit is operatively connected to said second actuator in order to drive the rotation of said rotary head from said grip position to said release position with said movable trolley in said outgoing travel.

6. The enveloping machine of claim 5, wherein said logic control unit is programmed for sending a first drive signal to said first actuator in a first time instant, and a second drive signal to said second actuator in a second time instant, following said first time instant.

7. The enveloping machine of claim 1, further comprising a brushing station for brushing a projecting section of the plates, wherein said brushing station is mounted on said support structure, is interposed between said storage and said enveloping station, and comprises at least two counter-rotating rollers spaced from each other by a passage slit extended along said first movement direction;
wherein said gripping device is configured to retain each plate with the corresponding projecting section which intercepts said passage slit.

8. The enveloping machine of claim 1, wherein said first actuator comprises a movement belt, which is wound as a ring between at least one motorized roller and an idle roller, is extended parallel to said first movement direction, and carries said movable trolley fixed thereto.

9. The enveloping machine of claim 1, wherein said second actuator comprises a rotary motor mounted on said movable trolley and carrying said rotary head mounted thereon.

10. The enveloping machine of claim 1, wherein said gripping device comprises a first movable trolley and a second movable trolley; wherein said first actuator is configured to position said first movable trolley at said storage with said second movable trolley positioned at said enveloping station and vice versa.

11. The enveloping machine of claim 1, wherein said gripping device comprises at least one sucker mounted on said rotary head and susceptible of picking up and retaining each plate by means of suction.

12. A method for manipulating plates for electric storage batteries by means of the enveloping machine of claim 1, the method comprising:
- a pick-up step, in which said gripping device picks up each plate placed vertically from said storage;
- a manipulation step, in which:
  - said first actuator moves said movable trolley from said storage to said enveloping station, and
  - said second actuator moves said rotary head from said grip position, in which said plates are placed vertically, to said release position, in which said plates are placed horizontally;
- a release step, in which said gripping device horizontally deposits each plate at said enveloping station.

* * * * *